United States Patent [19]
Webb

[11] Patent Number: 4,769,249
[45] Date of Patent: Sep. 6, 1988

[54] PROCESS FOR DEHYDRATING AND PUFFING FOOD PARTICLES

[76] Inventor: Wells A. Webb, Buckskin Mt., Orovada, Nev. 89425

[21] Appl. No.: 64,688

[22] Filed: Jun. 22, 1987

[51] Int. Cl.⁴ .............................. A23B 1/14; A23L 1/01
[52] U.S. Cl. ........................................ 426/438; 34/92; 99/470; 426/445; 426/465
[58] Field of Search ............... 426/438, 439, 440, 445, 426/465, 640; 99/470; 34/92

[56] References Cited

U.S. PATENT DOCUMENTS

| | | | |
|---|---|---|---|
| 3,521,373 | 7/1970 | Pagnozzi | 34/92 |
| 4,006,260 | 2/1977 | Webb et al. | 426/438 |
| 4,566,376 | 1/1986 | Webb | 99/470 |

*Primary Examiner*—George Yeung
*Attorney, Agent, or Firm*—Baker, Maxham & Jester

[57] ABSTRACT

Food particles are automatically puffed in large quantities and dehydrated to 2% moisture content in a single-stage vacuum-fry system. Whole grapes, slices of apples, pineapples, banana, onion and the like in the fresh condition, are puffed and dehydrated to 2% moisture content without loss of natural color and flavor, in a two-stage vacuum-fry system.

11 Claims, 8 Drawing Sheets

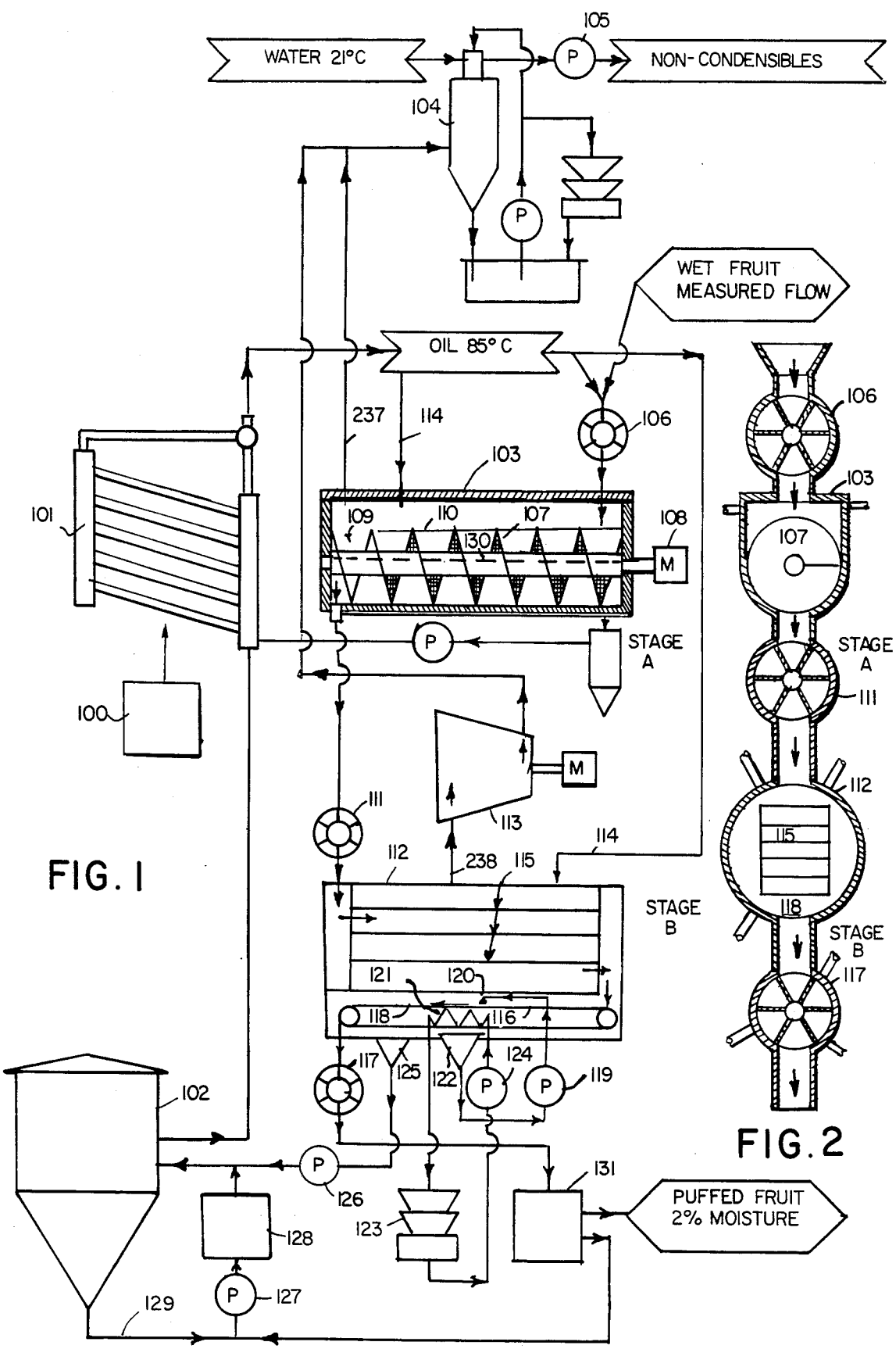

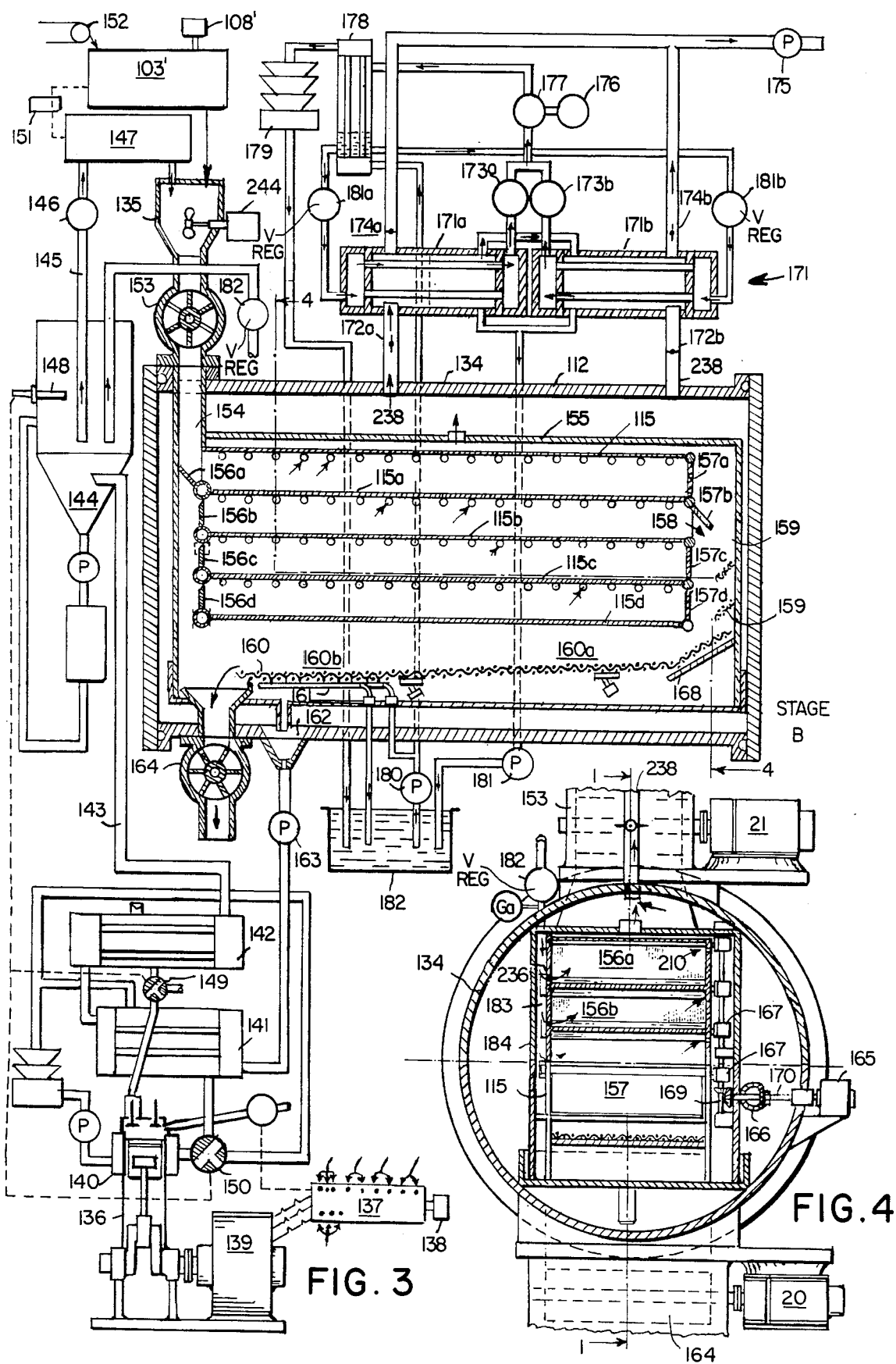

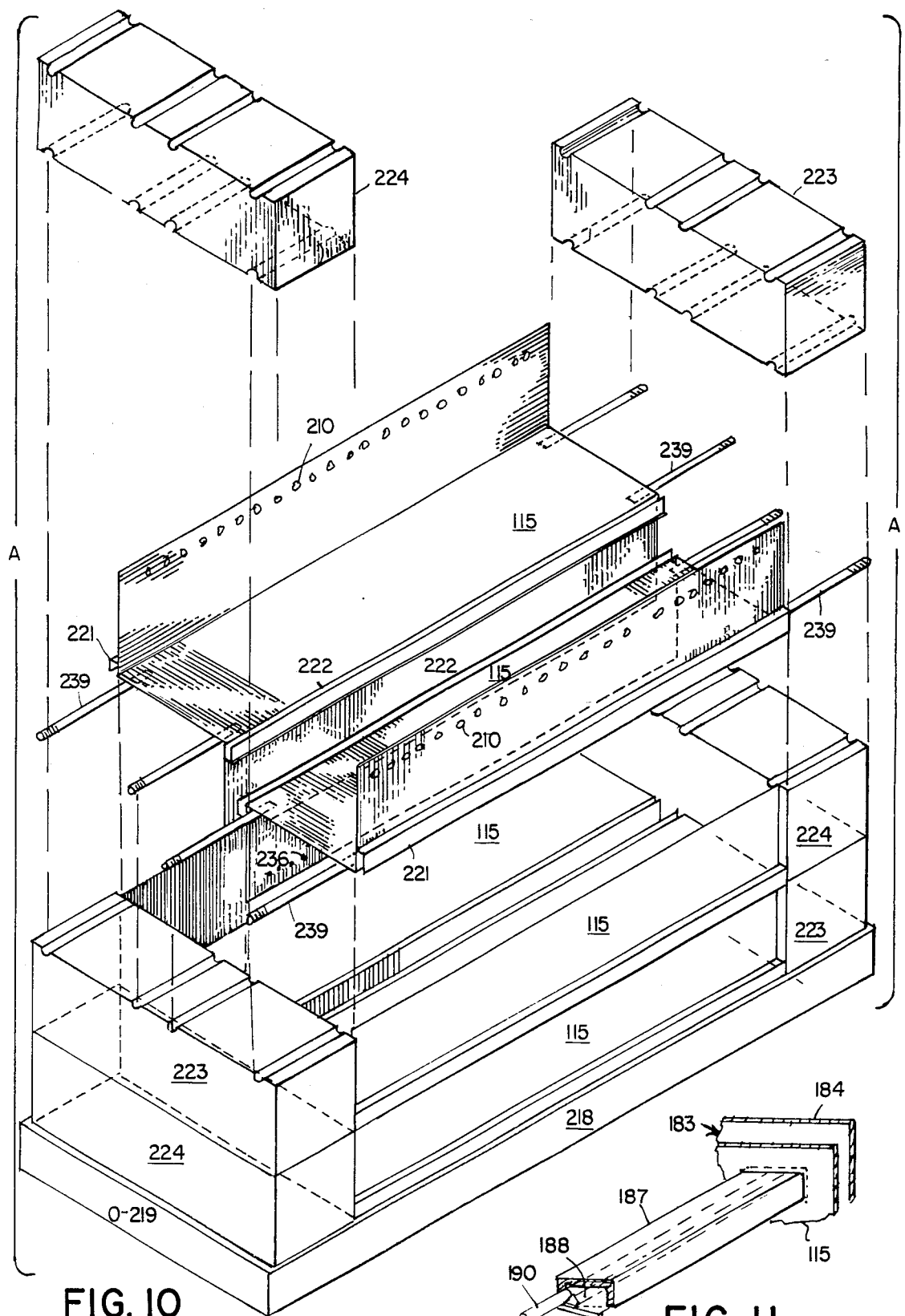

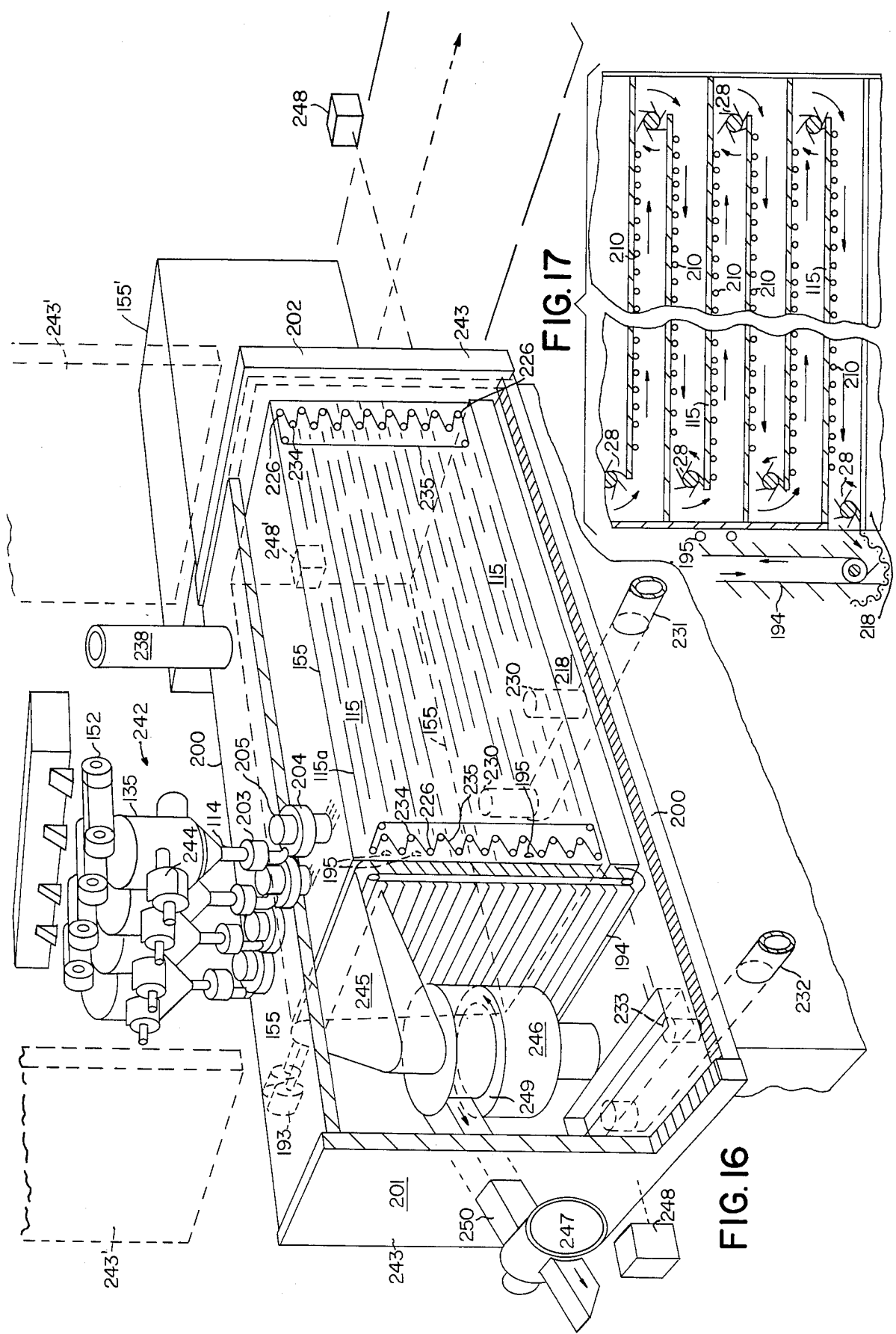

PROCESS FOR DEHYDRATING AND PUFFING FOOD PARTICLES

BACKGROUND AND OBJECTS OF THE INVENTION

The present invention relates to the vacuum art and practice of dehydrating and puffing fruits and vegetables, and in particular to the use of heated edible oils as a liquid heat transfer agent to effect rapid evaporation of natural moisture of the comestible in a vacuum environment. In the past, much land labor has been required, and volume of output has been small. The present invention is addressed to automation and the production of large quantities of output of puffed, crisp product of high quality. The manufacture of the first samples of such comestibles is described in my U.S. Pat. Nos. 2,283,302; 2,110,184; 4,006,260; and 4,556,376. The latter patent claims a system for automation.

In this art, the comestible is enclosed in a vacuum vessel in which the absolute pressure is reduced to only a few millimeters of mercury measure or torr. Then heated edible oil is made to contact the comestible without causing caramelization of the natural sugars or deleterious change of flavor or color. The oil is circulated through a heater and returned to act as a heat transfer liquid overcoming the latent heat of evaporation of the natural moisture. When the moisture content has been reduced to about 2%, the oil is cooled and this cools and hardens the fruit and fixes the puffed structure that has resulted from rapid evaporation. Then the cool oil is drained away. Centrifugal action may be used to assist drainage. The deoiled fruit is returned to normal atmosphere without collapsing the newly generated pores.

An object of the present invention is to provide an automatic system that is capable of very high yield rates of puffed, crisp apple slices, pineapple slices, banana slices, onion slices, and especially of puffed grapes and of puffed raisins, and of other sliced or whole fruits and vegetables as may be suited for the system herein described.

Another object is to provide a true continuous process in which the fresh comestible is inserted as a conveyor-borne stream into the vacuum treater, and is recovered as a stream of finished product ready for packaging, at high yield rate.

Another object is to provide a system that continuously delivers large quantities of high quality product.

The present invention is essentially one of flotation in the vacuum environment. For those comestibles that must be substantially dehydrated before puffing occurs sufficient to make them buoyant such as fresh grapes, apple chunks, pineapple chunks, banana slices, and the like, I provide an initial Stage A. This is a continuous vacuum chamber with a scroll that moves along the sinking comestibles until they have become sufficiently dehydrated by the oil they are in contact with, to become buoyant and to float in this oil. Then the floating comestibles are transferred through a rotary trap into the interior of a second Stage B that provides finishing dehydration down to less than 2% moisture content. The dehydrated comestibles are then cooled and continuously removed from the vacuum chamber, ready for packaging. Dwell time in Stage A is less than an hour; in Stage B, the comestible stays one or two hours.

For those comestibles that will float almost instantly upon being injected into a vacuum environment, especially commercially dried fruit containing 15-25% moisture, I warm them up in vegetable oil to about 85° C. and inject them into my Stage B without preliminary treatment in Stage A.

Hence in the following description, Stage B apparatus is described as being either related to Stage A, or independent of Stage A, depending on circumstances.

I make efficient use of space in my vacuum chambers by mounting trays one over the other. Thus, in my Giant Raisin Puffer, I mount as many as 17 trays one over the other in a large lettuce vacuum cooling chamber, and get as much as 6 or more tons per hour of high quality puffed raisins yield in continuous output rate.

Some fruits and vegetables, when thinly sliced are very delicate, and do not withstand manipulation in a machine without breaking up. examples are: thin apple slices, thin onion, strings, pineapple cross-cuts and the like, where the cuts are across the axis of the fruit, and are large and of 3/16 inch thickness and thinner. After these fruit cuts are dehydrated partially and puffed, they are finished dehydrated in a Stage B apparatus where they remain on one tray 115 until ready for discharge, and thus manipulation and the risk of breaking large, thin slices is minimized. Such Stage B apparatus is illustrated in FIGS. 3, 4, 5 and 6. On the other hand, thicker chunks, more than 3/16 inch thick are successfully dehydrated and recovered unbroken even when the Stage B apparatus moves them repeatedly from a higher level to a lower level, as in the procedures followed in the apparatus of FIGS. 7, 8, 9, 10 where an impeller is used. Raisins and fresh grapes are examples of fruits that will withstand much manipulation without damage.

BRIEF DESCRIPTION OF THE DRAWINGS

The above and other objects and advantages of the present invention will become apparent from the following description when read in conjunction with the accompanying drawings wherein:

FIG. 1 is a materials flow schematic showing the system for two stages and two degrees of vacuum measure for puffing fresh fruit particles in Stage A, and finishing the process in Stage B.

FIG. 2 shows schematically the progress of materials flow of comestibles through Stage A and Stage B.

FIG. 3 shows details of Stage B vacuum chamber and includes description of co-generation and energy conservation applicable to Stage A also, whereby fuel burned in a prime-mover supplies latent energy for evaporation and electrical energy for movement.

FIG. 4 is a crossection of the vacuum chamber of FIG. 3 taken along line 4—4 of FIG. 3.

FIG. 10 shows mode of construction of the sheet metal trays and their assembly with the end blocks to make the core of the Stage B Raisin Puffer.

FIG. 11 is a detailed illustration of the manner of constructing the flood box of FIG. 6.

FIG. 16 is a perspective drawing of a Giant Raisin Puffer.

FIG. 17 shows the manner of circulation of materials through the Raisin Puffer.

FLOW OF MATERIALS AND ENERGY

Figure 5:
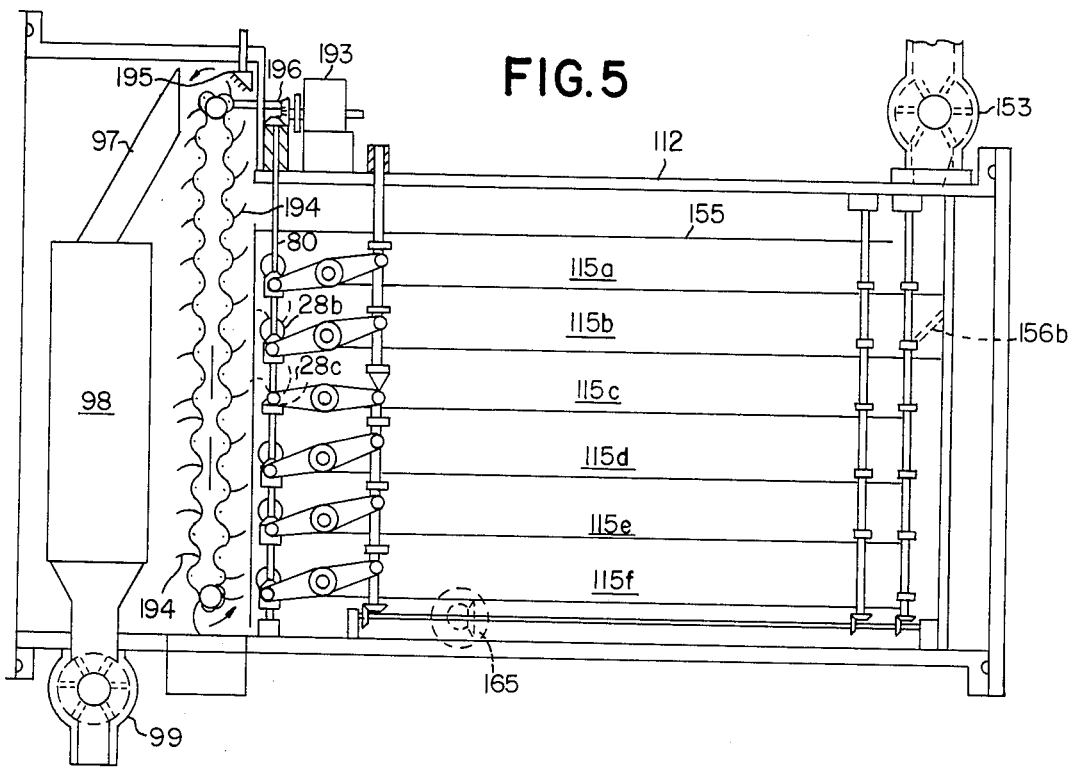
FIG. 5 is a section in elevation of a vacuum chamber adapted to process comestibles in Stage B, the finishing stage.

Fresh fruit slices are injected into Stage A mixed or fluidized in hot oil at about 85° C. through rotary trap 106 as in FIG. 1, and FIG. 2. Fuel burned in furnace 100 supplies heat to oil heater 101 which is at atmospheric pressure and is supplied with a stream of oil from reservoir 102. Oil at about 85° C. flows into Stage A vacuum chamber 103, and is also used to fluidize the incoming stream of prepared comestibles. Stage A vacuum chamber is maintained at an absolute pressure of about 50 torr, by the vacuum system that comprises water cooled barometric condensor 104 and mechanical or jet pump 105 for non-condensibles. The vacuum chamber 103 contains a scroll 107 driven by motor 108. The feed material, consisting of comestible particles mixed or fluidized in oil enters the first flight of scroll 107 and moves slowly to the left or exit flight of the scroll by rotation of the scroll. All flights of this scroll except the exit flight are composed of screen. On the other hand, flight walls 109, composing the exit flight are composed of imperforate sheet metal. Thus the oil level over flights 107 may be held constant, at an arbitrarily chosen level such as 110 or 130; but the oil level in flight 109 may rise and fall according as the constant of the flight space fall into trap 111, or a momentarily held back. From trap 111 the comestible, now puffed and partially dehydrated, falls into Stage B vacuum chamber 112, where the absolute pressure is in the range 5–20 torr. Chamber 112 is constructed to operate in a continuous manner according to the mode about to be described for FIGS. 3, 5 and 8. Vacuum in chamber 112 may be maintained by an independent system, or by a system connected to operate in conjunction with condensor 104 an vacuum pump 105 through a rotary compressor such as 113 that acts as a vacuum booster. Heated oil is supplied to vacuum chamber 112 through conduit 114 from oil heater 101. The fruit dwells in the floating condition on trays 115 until completely puffed and dehydrated to about 2% moisture content, in contact with a cross-current of flowing heated oil; then the puffed, dehydrated particles are discharged into a cooling device, which may be a tray of cool oil, or cold spray on a bucket elevator containing the fruit, or a belt 116 on which cool oil is sprayed. The cool, hardened particles are deoiled by draining into belt 118, and then they are discharged from the vacuum environment through rotary trap 117. From trap 117, the particles go into a centrifugal machine 131 that removes further traces of oil and then they are packaged. Cooling spray for belt 116 is oil circulated by pump 119. This oil issues from nozzle 120, passes over the particles being cooled and passes over cooling coil 121. The oil is thereby cooled, and is then collected in sump 122 and passes into the suction of pump 119 which recirculates the oil. Water for cooling coil 121 is cooled by water cooler 123 and is re-circulated through coil 121 by water pump 124.

Hot oil collected from vacuum chamber 112 in sump 125 is at about 80° C. This oil is removed from sump 125 by pump 126 and is returned to tank 102. Cold oil is returned to tank 102 through pump 127 and filter 128, which keeps the oil clean of broken small particles. By-pass 129 circulates oil through filter 128.

FIG. 2 gives a concise review of solid material flow. Solids containing natural fruit moisture of the fresh fruit enter the constant-rate evaporation stage where the vacuum is about 50–100 torr and oil at about 80°–95° C. causes evaporation until the moisture content has been reduced from the initial condition of 80–90% down to the range 25–15% and the fruit has become puffed and buoyant in oil. This is Stage A. The particles pass through trap 111 into Stage B vacuum chamber 112 where the absolute pressure is about 5–25 torr and oil at about 85° C. flows across the trays 115 and heats the fruit, and in an hour or two, depending upon the nature of the fruit, causes complete evaporation of moisture. The fruit after puffing and dehydration is cooled to fix the puffed structure, then it passes through trap 117 to normal atmosphere, ready for packaging. Details of the Stage B operation are given in what follows.

APPLE CHIPS PUFFER

For delicate particles, such as large, thin slices of apple of about 1/10 inch thickness, thin slices of pineapple, banana or of onion strings, that are easily broken into undesired smaller pieces, physical abuse is reduced by a Stage B that dehydrates entirely on one tray 115. This is the kind of action that is depicted in FIGS. 3, 4, 5 and 6.

The thermodynamic relationships about to be described in relation to the apparatus of FIG. 3 can also be applied to the two-stage process of FIG. 1. Apple chips can be made either from fresh slices in the two-stage process of Stage A followed by Stage B, or from partially dried commercialslices of 24% moisture content fed into Stage B alone.

Fuel is injected into a diesel engine or other prime mover 136 of FIG. 3 which turns dynamo 139 and supplies electrical energy to computer-bus 137 that is timed by constant speed motor 138. The various timed electrical energy activities about to be described are supplied by computer bus 137. Engine cooling liquid is circulated around tubes of heat exchanger 141, and engine exhaust gases circulate around tubes of heat exchanger 142. Inside of these tubes, circulates vegetable oil used as heat transfer medium in the dehydration and puffing system. Heated oil from heat exchanger 142 rises through pipe 143 to be discharged into oil reservoir 144, whose temperature is regulated by thermostat 148 that acts by remote control on regulating valve 149 to control damper action and on regulating valve 150 to control the by-pass of engine cooling fluid when necessary. Thus is secured a reliable and economical supply of electrical and thermal energy for the dehydration purposes, available in amount and intensity as needed.

The core element 155 in which vacuum fry occurs in Stage B comprises an assembly of trays 115 placed one over the other. Heat is supplied as hot oil through pipe 145 and pump 146, flowing through regulator tank 147 to mix with prepared comestible from supply 103'. A weighing feeder 152 regulates flow rate of comestible. The oil and comestible are fluidized in tank 135 and the mixture passes through trap 153 into the feed port 154 of vacuum chamber 134, regulated by proportioner 151.

The foregoing mixture meets an open entrance gate 156a and fills the space enclosed by tray 115z and closed exit gate 157a. At the same time, gate 157b of the tray beneath tray 115a has opened, allowing contents of tray 115b to discharge into exit port 158. The discharging contents pass over a series of screens 159 where hot oil passes through the screen and the puffed, dehydrated comestible falls onto vibrating belt 160a; residual oil passes through the belt into sump 168. The comestible continues to travel on the belt to 160b, where it is cooled and the puffed structure is hardened and fixed. Cooling of portion of screen 160b is done by refrigerated plate 161. Oil on sump 168 passes into funnel 162 and is recirculated by pump 163. Comestible particles, now in finished state fall off screen 160 into rotary trap 164 and are discharged into the atmosphere ready for packaging.

When Stage B is operating alone, not in conjunction with Stage A, it must have its own high vacuum system, capable of pulling a vacuum of 5 torr or better. As an example of such an independent system, I give the refrigerated condensor system of FIG. 3. Here, two frost condensors operate in alternation under control of butterfly valves in vacuum pipes that lead from chamber 134 and evacuate the chamber. Water vapor from chamber 134 is converted to frost on tubes of refrigerated condensors 171a–171b and non condensibles are passed through valves 174a–174b to vacuum pump or jet pump 175. Refrigerant vapor from the inside of the condensor tubes passes valves 173a–173b, is compressed by pump 176–177, is passed to condensor 176 and condensed. Condensor 178 is cooled by water from cooling tower 179, which passes its water to cold-well 182. In utilizing the sides of double condensor 171 alternately, the side that is covered with frost is cleared of frost by shutting off refrigerant from that side while passing water vapor from the vacuum chamber through that side first, then through the alternate side, where refrigerant is flowing, and will condense water vapor that has passed the frosted side. This manipulation of the vacuum and refrigerant valves permits continuous condensation of water vapor from the vacuum chamber in one frost condensor, while at the same time melting the frost and recovering liquid water from the opposite frost condensor.

With reference to FIG. 4, hot oil enters the vacuum chamber 134 through valve 182, and enters a manifold oil channel 183 formed by baffle 184 and the sides of trays 115. Hot oil enters the tray space at the lower edge 236 of each tray, and after it passes across the tray and heats the comestible causing evaporation, oil and water vapor together exit the tray spaces through holes or a screen in the upper and opposite edge 210 of each tray. Thereby a system is set up for the continuous impartation of heat energy to the comestible and evaporation therefrom of natural moisture. The dwell time in Stage B is terminated when the desired degree of puffing and dehydration is completed, by opening a gate 157 at the opposite end of the tray from the entrance gate. Then a deluge of oil, which may be cold oil washes out the comestible, the oil coming from a floodbox as in 187 of FIG. 6, and 191, the flood-box gate. The flood-box is illustrated in closer detail in FIG. 11. Oil for the flood-box comes from the port 183 between baffle 184 and trays 115.

Trays 115 retain their content for one to three hours, depending upon the rate of dehydration of the comestible. Timing is set up beforehand for each run of comestible, at the rate that is suited for the particular comestible.

Figure 6:
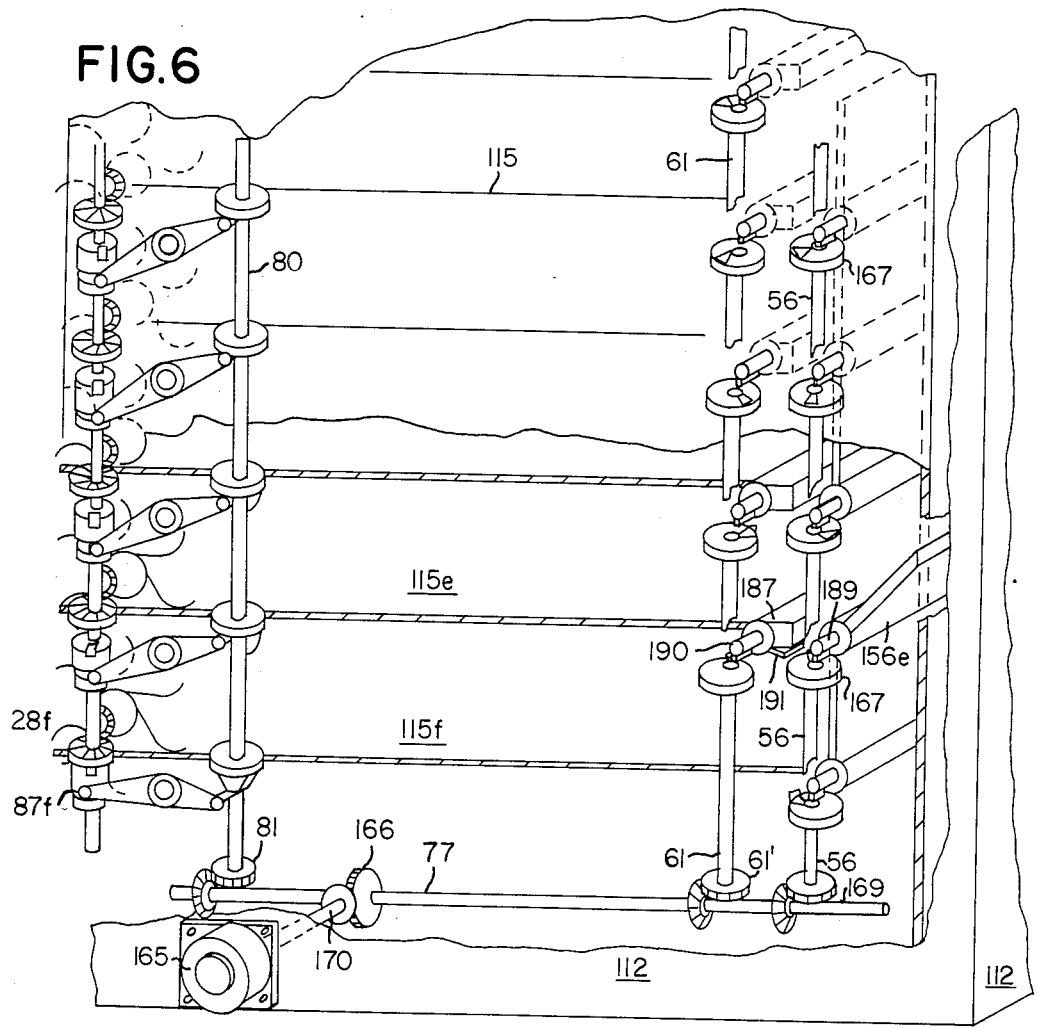
FIG. 6 is a view in perspective fragment of mechanical details of the apparatus of FIG. 5.

Alterate mechanical arrangements that are suitable for Stage B are detailed in FIGS. 5 and 6. The vacuum chamber 112 receives its charge of comestible through rotary star valve 153. The charge passes down port 154 until it meets an open gate 156b, which directs the charge into tray space 115b where the charge dwells until it has been dehydrated and puffed. Then the charge is discharged by rotation of impeller 28b which empties floating particles from the body of oil maintained in tray space 115b and deposits the particles of comestible on elevator buckets 194, which are rising. An oil spray of cold oil from spray nozzles 195 plays over the contents of the rising buckets, cooling the comestible and hardening the puffed structure. The bucket conveyor, at the top of its flight, throws the puffed comestible and oil content of its buckets into funnel 97, which delivers into continuous centrifuge 98. Oil-free puffed comestible is discharged from vacuum through rotary trap 99. A motor 193 drives bucket conveyor 194, and also, through a bevel gear pair 196, the motor drives clutch timing cam shaft 80, at constant speed.

With reference to FIG. 6, motor 165 drives shaft 170 and bevel gear pair 166 is turn shaft 77 that times actions at each end of trays 115. The sequences of clutch cam shaft 80 are driven by bevel gear pair 81 in synchronous action with the sequences of flood-box cam shaft 61 which is driven by bevel gear pair 61' and the sequences of gate cam shaft 56 which is driven by bevel gear pair 169. The actions depicted in FIG. 6 show clutch 87f engaged, and therefore tray 115f being discharged by impeller 28f, which, at the moment is turning. All other impellers 28 being still; cam 190 has opened flood box gate 191, oil washing out contents of tray 115p; at the same time, cam 189 opens gate 156e to fill empty tray 115e; this is the regular sequence that passes all trays, and allows continuous flow of raw comestible in, and puffed dehydrated out.

The foregoing apparatus comprises a gentle system for dehydrating delicate thin sections of apple in one stage, from the fresh condition in very thin sections of less than ⅛ inch thickness. The slices must be fed in slowly with a high proportion of oil—about 90% oil to 10% apple slices by weight. The vacuum must be high, about 5 torr, and the temperature about 90° C. Under these conditions, when the apple slices have had a minute or two to become heated in the hot oil before being vacumized, the slices will float away from entrance 154 and not clog it up. It is best to run an excess of the hot oil down this entrance after the full charge of apple slices has been injected onto tray 115. Then gate 156a can be closed and another tray filled.

GIANT RAISIN PUFFER

I have discovered an efficient way to utilize the potential processing capacity of the large lettuce cooling vacuum chambers for the production of puffed raisins. In my Mobile Vacuum Cooling Plant of U.S. Pat. No. 3,110,163 vacuum chambers of seven feed diameter and forty feet long are readily available together with auxilliary vacuum equipment. Even larger chambers have been built since that patent was issued, and I make use of the largest in FIGS. 16 and 17. The interior space of large vacuum chambers is utilized efficiently in the following manner, that applies especially to the vacuum-fry and puffing of fresh seedless grapes and seedless raisins, of the present invention.

Figure 8:
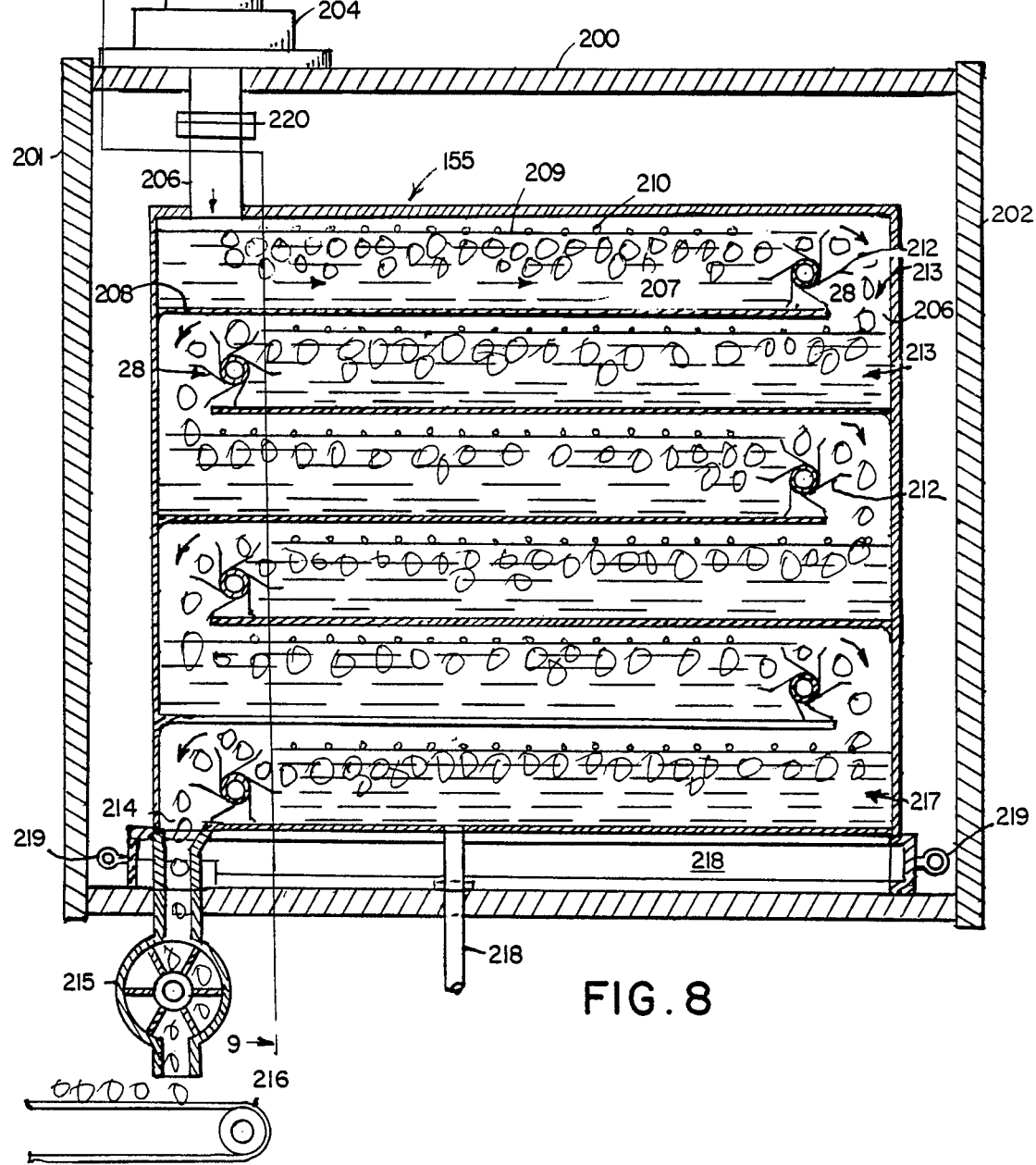
FIG. 8 is a longitudinal section of a finishing chamber for Stage B in which the floating comestible progresses at a measured rate from the highest elevation to the lowest and is then discharged, while maintaining an oil level in each tray.

With reference to FIG. 8, the vacuum chamber 200 is rectangular in crossection, with a door 201 and 202 at either end. The feed materials, partially dehydrated and puffed fresh grapes from Stage A, steamed raisins, chunks of dehydrated apple, etc., mixed with vegetable oil at about 85° C. is fed in measured proportions through valve 203 to turbine 204 which may be constructed from a sump-pump case with efficient turbine blade impeller. The feed, going from atmospheric pressure into the vacuum chamber at 5-20 torr, has energy to give up, and this is taken by the turbine and dynamo 205. The feed passes entrance port 206 to occupy the liquid layer 207 of tray 208. The liquid rises to level 209 of the exit holes for oil and water vapor 210. The mixture of comestible and oil at 85° C. undergoes agitation from issuing water vapor, and moves toward impeller 211. Impeller 28, with vanes 212 is constantly rotating at moderate speed, about 50-150 RPM, and discharges a mixture of comestible and oil 213 into the entrance 206 of the tray below. The mixture of comestible and oil travels from right to left and from left to right and downward until it has reach exit port 214 at the lowest level; then the comestible passes out of the vacuum chamber through rotary trap 215 onto belt 216 where oil is separated out.

Control of rotating speed of impeller 28 gives control of rate of progress of the mixture of commestible and oil through the apparatus. Therefore impeller speed is adjusted to meet reqirements of the comestible being processed. For a slow rate of dehydration, the impeller rate is accordingly slowed down so that the delivered product is always at 2% moisture content or less. The last tray or lowest one, 217 is for cooling the comestible and fixing the puffed structure. Cold oil enters this tray through pipe 218.

Figure 7:
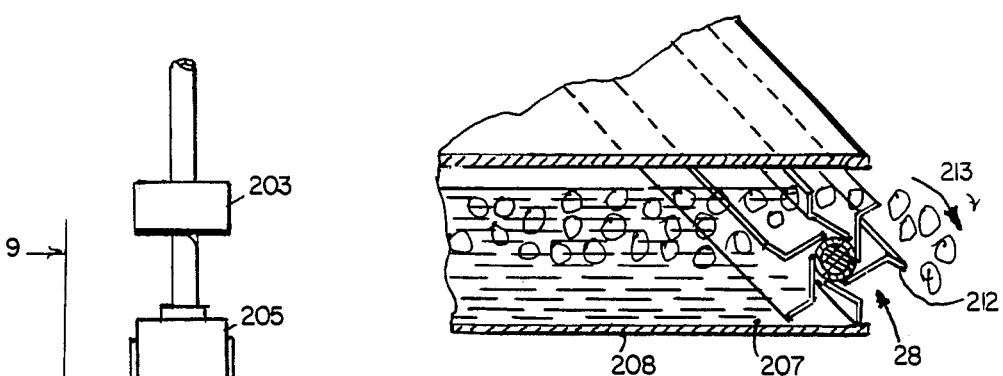
FIG. 7 shows a detail of the action of the impeller that is employed in the apparatus of FIG. 8, for metering comestible flow rates.

FIG. 7 shows the construction and action of the impeller 28 and its vanes 212. The vanes may be made flexible of thin steel, of shim-stock and the like so they are able to rub the bottom of the tray and prevent escape of oil there. The shape of the vane tip catches raisins and lifts them out of the oil and throws them into the tray beneath. Rotation of the impeller is clock-wise in those trays on the left of the impeller of FIG. 8, and the rotation of the impeller is counter-clockwise in those trays on the right side of the impeller.

The trays are stacked one on the other upon frame and base 218. Base 218 has cable hooks and eyes 219 for pulling it out of vacuum chamber 200 when doors 201 and 202 are open for inspection of the core assembly of trays that rest upon it.

Figure 9:
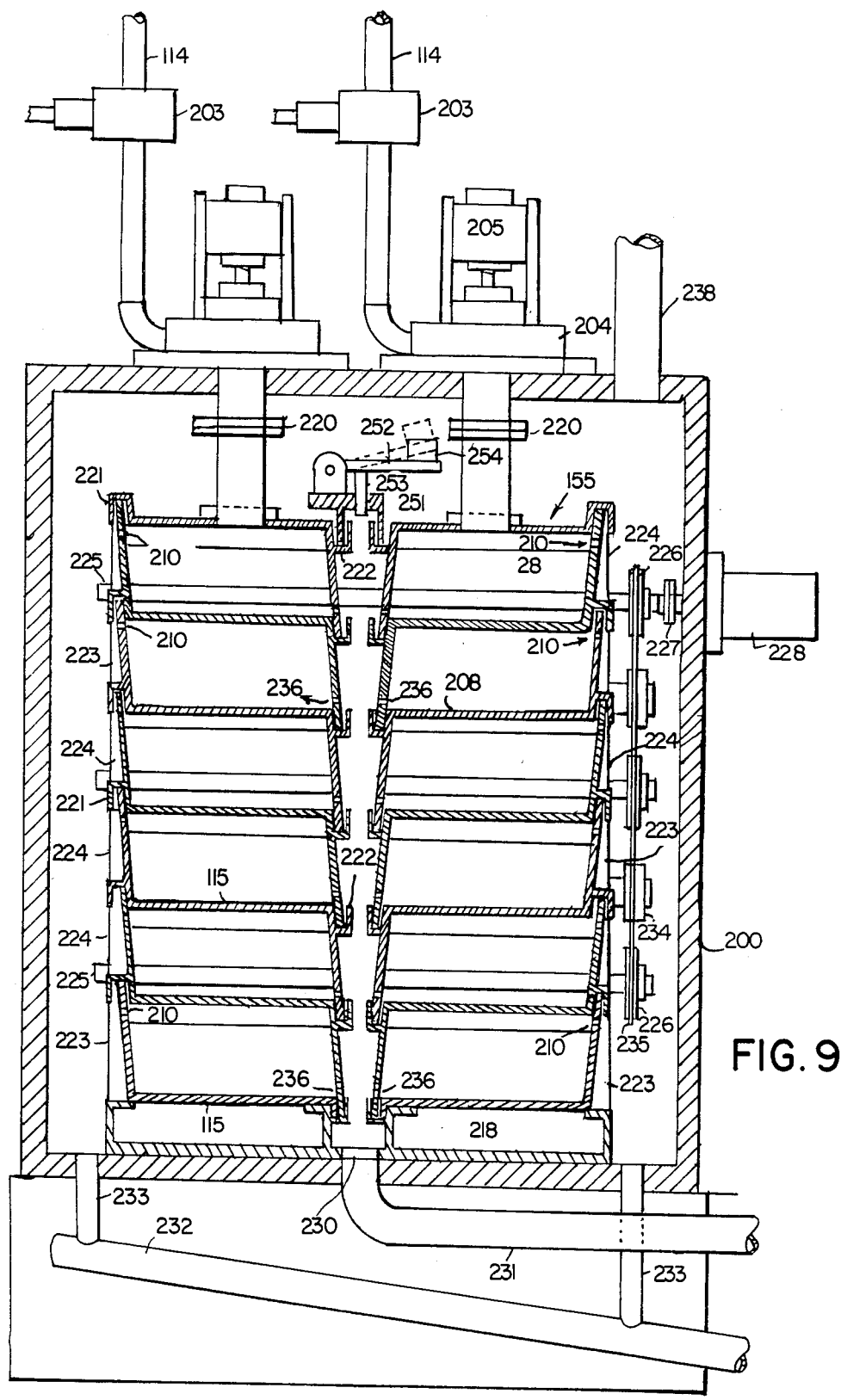
FIG. 9 is a crossection of the apparatus of FIG. 8 taken along the line 9—9.

The trays 115 are made of sheet metal, with lips 221 and 222 welded on. The impellers 28 are mounted in end blocks 224-224 that alternate in the stacking with turning blocks 223 as shown in FIGS. 9, 10, 12, 13 and 14. In FIG. 9 the feed inlet connections 220 and the oil inlet connection 230 are shown. These connections, together with motor drive connection 226 for the impeller are made to be easily broken when the core assembly with its base 218 is pulled out of the vacuum chamber for inspection.

The impellers 28 are assembled as impeller shaft 225 is pushed into the impeller block 224. Threaded tie rods 239 are welded to the trays 115, and serve to bind the assembly of trays and blocks together when fastened with nuts and washers 240 as in FIG. 14.

The drawings so far have shown small units, or pilot plant versions of my invention. The large, full size versions are obtained by putting more trays in larger vacuum chambers, and making the tray spaces longer. This can be done because the floating raisins will go anywhere there is a river of oil, no matter what the distance to the exit. The trays 115 must be perfectly level. Then a current of oil is set up by the oil in the incoming feed and oil removed from the opposite end of the tray. No matter how far away from the input location, the current will flow, carrying in its upper regions the particles of raisin or grape or apple, as the case may be. This will be the case in each tray of the stack, no matter how high the stack.

Figure 15:
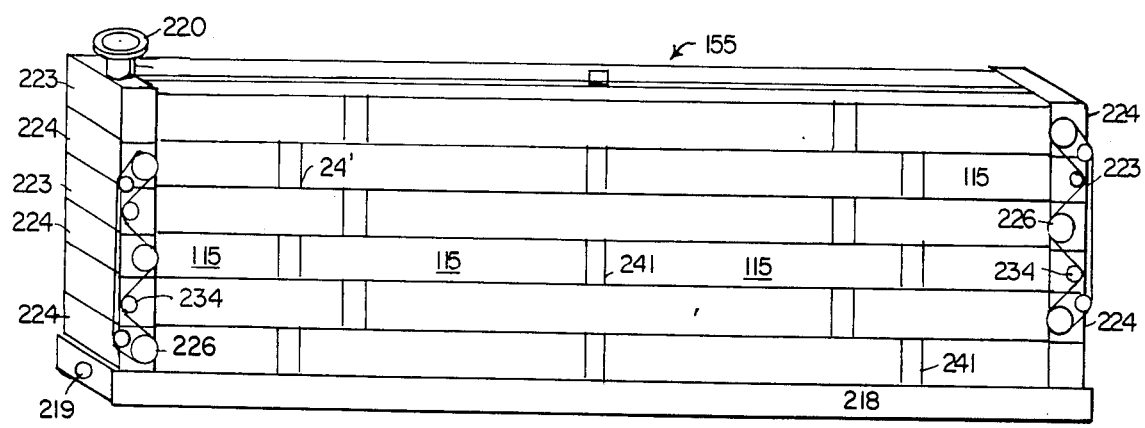
FIG. 15 illustrates the manner of joining trays 115, one with the other to make a stage B raisin puffer with "stretched" length.
Figure 12:
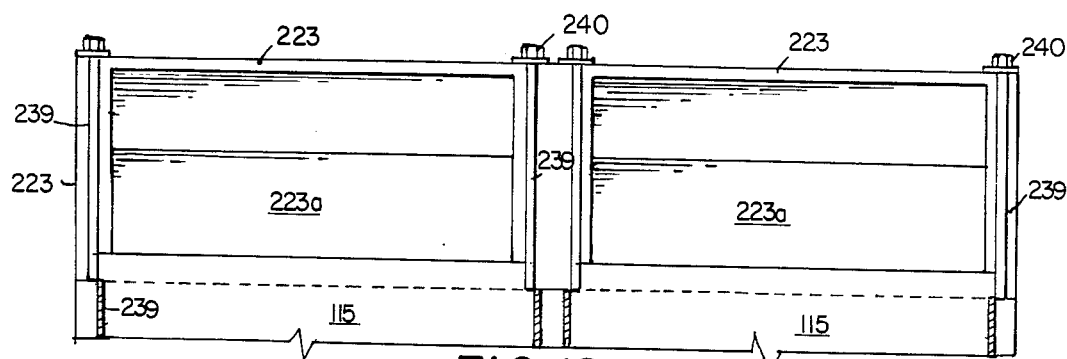
FIG. 12 is a view in sectional plan showing the manner of joining trays with the end blocks.
Figure 13:
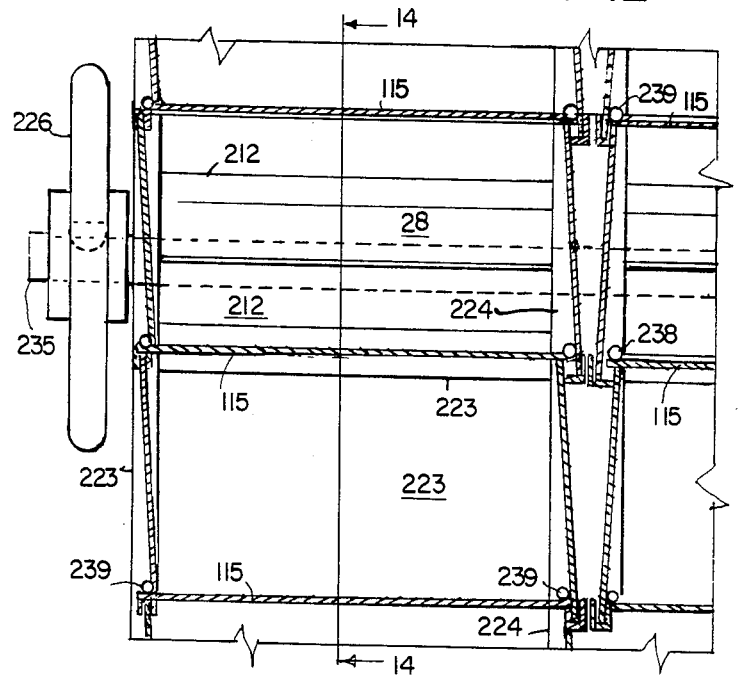
FIG. 13 is a view in sectional elevation showing the manner of mounting the impeller inside the end block.
Figure 14:
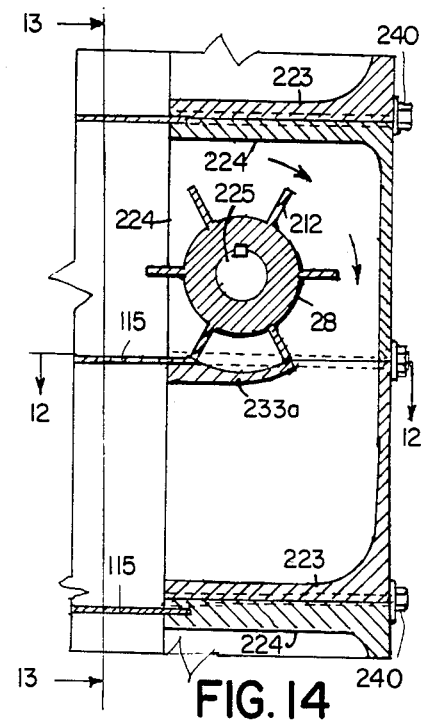
FIG. 14 shows an end view in section of the impeller inside the impeller block, and the turning block.

The manner of stacking and extending tray length is shown in FIG. 15. Here there are gussets 241 that permit any length of core to be laid up on a base 218. The core so constructed is pulled by cable attached to eye 219 through the open doors 243 of the Giant Raisin Puffer shown in FIG. 16. Here the width may be as much as eight feet, and the length of the lettuce cooler chamber that is employed may be sixty feet or more. In FIG. 9 one pair of tray stacks are shown. The width of this stack pair is four feet. Two of such pairs of stacks fit into the larger vacuum chamber, and are fed by a four-unit feed system shown in the drawing under the general designation 242.

The circulation of the fluidized comestible in hot oil is shown in the fragmentary view of FIG. 17. Oil level in each tray is kept at the level 210 of the exit holes for each tray. The impellers 28 maintain this level, and skim off the top layer of floating fruit. The comestible with a regulated current of oil progress downward to outgoing impeller 28a and are discharged into bucket elevator 194 which hoists the comestible past cold oil spray nozzles 195, and delivers the cooled, hardened raisins, now puffed, to the hopper 245, which delivers them into continuous centrifuge 246. The centrifuge quickly deoils the raisins, delivering them into ring conveyor 249, which sends them down chute 250 to rotating trap 247, and out into the atmosphere to packaging.

Core 155 can be moved out of chamber 200 by opening both doors 243 and attaching a cable to eye 219, then pulling with a winch 248. A second core that has been serviced for cleaning, 155' can then be winched into position in chamber 200. In this way continuous operation of the puffing plant can be assured.

I claim:

1. A process for dehydrating and puffing raw food particles comprising the steps of:
    selecting a pressure vessel defining a closable chamber;
    establishing multiple horizontal support means in said chamber for supporting raw food particles;
    introducing a quantity of raw food particles into said pressure vessel on said support means at one end thereof;
    introducing a heated cooking oil into contact with said fruit particles in said chamber;
    maintaining said cooking oil at a temperature of from about eighty degrees Centigrade to about one-hundred degrees Centigrade;

establishing a vacuum in said chamber in a range from about five to about twenty-five torr;

maintaining said heated cooking oil in contact with said raw food particles until the food particles are substantially puffed and the moisture content of said particles is reduced to about two percent; and removing said food particles from said support means at the other end thereof.

2. A process according to claim 1 wherein:
said plurality of means is established by the steps of mounting a plurality of rectangular trays in said chamber in a vertical array.

3. A process according to claim 1 wherein:
said cooking oil is continuously circulated through said chamber.

4. A process according to claim 1 wherein:
said food particles and said cooking oil are maintained in a continuous flow through said chamber.

5. A process according to claim 2 wherein:
said cooking oil and said particles are introduced into said vessel at a top thereof and said cooking oil and particles flow through said vessel from said top across each from tray to tray across each level therein.

6. A process according to claim 1 includes the steps of establishing a first chamber in series with a second chamber and wherein said step of contracting said particles includes contacting said particles in said first chamber for a sufficient time to reduce the moisture content thereof to a range of about fifteen to twenty-five percent moisture and thereafter introducing said particles into a second chamber for reducing said moisture content to about two percent.

7. A process according to claim 6 wherein;
said food particles are moved in contact with said cooking oil continuously through said first chamber and in a continuous movement through said second chamber.

8. A process for dehydrating and puffing of food particles comprising the steps of:
selecting an enclosed chamber;
establishing a flow path having a plurality of vertically positioned horizontal levels through said vessel from an inlet at the top thereof to an outlet at the bottom thereof;
introducing a mixture of food particles and cooking oil in the inlet of said vessel;
establishing a temperature of said oil between about eighty degrees Centigrade and about one-hundred degrees Centigrade;
establishing a pressure in said vessel of between about five and about twenty-five torr; and
maintaining said cooking oil in contact with said food particles as the food particles move through the levels in said vessel until the food particles are substantially puffed and the moisture content of said food particles is reduced to about two percent.

9. A process according to claim 8 wherein:
said processing includes the further step of separating said particles from said cooking oil and cooling said particles.

10. A process according to claim 9 wherein:
said food particles are moved from a first level to a second level in said chamber by means of an impeller.

11. A process for dehydration and puffing of raw food particles comprising the steps of:
selecting an enclosed chamber;
establishing a flow path having a plurality of vertically positioned horizontal levels through said vessel from an inlet at the top thereof to an outlet at the bottom thereof;
introducing a mixture of raw food particles and cooking oil in the inlet of said vessel;
establishing a temperature of said oil between about eighty degrees Centigrade and about one-hundred degrees Centigrade;
establishing a pressure in said vessel of between about five and about twenty-five torr;
moving said food particles from a first level to a second level in said chamber by means of an impeller;
maintaining said cooking oil in contact with said food particles as the food particles move through the levels in said vessel until the food particles are substantially puffed and the moisture content of said food particles is reduced to about two percent; and
separating said particles from said cooking oil and cooling said particles.

* * * * *